(12) United States Patent
Kuo et al.

(10) Patent No.: US 11,754,888 B2
(45) Date of Patent: Sep. 12, 2023

(54) DISPLAY PANEL

(71) Applicant: Au Optronics Corporation, Hsinchu (TW)

(72) Inventors: Tzu-Wei Kuo, Hsinchu (TW); Yi-Chu Wang, Hsinchu (TW); Hung-Che Lin, Hsinchu (TW); Shun-Ling Hou, Hsinchu (TW); Sheng-Ju Ho, Hsinchu (TW); Chian-Wen Hsu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/695,791

(22) Filed: Mar. 15, 2022

(65) Prior Publication Data

US 2023/0143881 A1 May 11, 2023

(30) Foreign Application Priority Data

Nov. 11, 2021 (TW) .................................. 110141948

(51) Int. Cl.
*G02F 1/1343* (2006.01)
*G02F 1/1335* (2006.01)

(52) U.S. Cl.
CPC .... *G02F 1/13439* (2013.01); *G02F 1/133531* (2021.01); *G02F 1/134345* (2021.01)

(58) Field of Classification Search
None
See application file for complete search history.

(56) References Cited

U.S. PATENT DOCUMENTS

| 7,209,205 | B2* | 4/2007 | Yoshida | G02F 1/134363 |
| | | | | 349/139 |
| 7,982,829 | B2* | 7/2011 | Hanaoka | G02F 1/1393 |
| | | | | 349/100 |
| 8,189,153 | B2* | 5/2012 | Ting | G02F 1/134336 |
| | | | | 349/129 |
| 10,663,806 | B2* | 5/2020 | Tae | G02F 1/133753 |
| 2003/0193625 | A1* | 10/2003 | Yoshida | G02F 1/134336 |
| | | | | 349/43 |
| 2011/0199550 | A1* | 8/2011 | Fan | G02F 1/1395 |
| | | | | 349/33 |

(Continued)

FOREIGN PATENT DOCUMENTS

| CN | 105487310 | 4/2016 |
| CN | 106597764 | 4/2017 |
| CN | 208621878 | 3/2019 |

*Primary Examiner* — Ryan Crockett
(74) *Attorney, Agent, or Firm* — JCIPRNET

(57) ABSTRACT

A display panel includes a first substrate, a second substrate, a liquid crystal layer, a pixel electrode, a common electrode, a first polarizer and a second polarizer. The pixel electrode includes a trunk portion, first to fourth branch portions, and first to fourth strip portions. The trunk portion extends along a first direction. The first and second branch portions are connected to a first end of the trunk portion. The third and fourth branch portions are connected to a second end of the trunk portion. The first strip portions are connected to the first and second branch portions. The second strip portions are connected to the third and fourth branch portions. The third strip portions are connected to the first and third branch portions and the trunk portion. The fourth strip portions are connected to the second and fourth branch portions and the trunk portion.

18 Claims, 9 Drawing Sheets

(56) References Cited

U.S. PATENT DOCUMENTS

| | | | |
|---|---|---|---|
| 2011/0199568 A1* | 8/2011 | Morishita | G02F 1/134363 349/141 |
| 2012/0075562 A1* | 3/2012 | Yeh | G02F 1/1368 349/139 |
| 2012/0314173 A1* | 12/2012 | Zhang | G02F 1/133753 349/143 |
| 2013/0010248 A1* | 1/2013 | Kang | G02F 1/1393 349/139 |
| 2021/0048716 A1* | 2/2021 | Cheng | G02F 1/13439 |

* cited by examiner

DISPLAY PANEL

CROSS-REFERENCE TO RELATED APPLICATION

This application claims the priority benefit Taiwan application serial no. 110141948 filed on Nov. 11, 2021. The entirety of the above-mentioned patent applications are hereby incorporated by reference herein and made a part of this specification.

BACKGROUND

Field of the Disclosure

The invention is related to a display panel, and more particularly to a liquid crystal display panel.

Description of Related Art

The liquid crystal display device includes a backlight module and a liquid crystal display panel overlapping with the backlight module. Generally speaking, by rotating the liquid crystal molecules in the liquid crystal display panel, the light emitted by the backlight module is controlled to pass or not pass through the liquid crystal display panel, so that so that the liquid crystal display device displays a predetermined screen.

The brightness of the liquid crystal display device is closely related to the transmittance of the liquid crystal display panel. The higher the transmittance of the liquid crystal display panel, the higher the brightness of the liquid crystal display device, and the power consumption of the liquid crystal display device can be reduced. In order to improve the transmittance of the liquid crystal display panel, some manufacturers adjust the ingredient of the liquid crystal layer, thereby increasing the transmittance of the liquid crystal layer. However, after modifying the ingredient of the liquid crystal layer, it is usually necessary to adjust the design of other optical layers to maximize the brightness of the liquid crystal display device. Therefore, the manufacturing cost of the liquid crystal display device is greatly increased.

SUMMARY

The present invention provides a display panel with the advantages of high transmittance and low manufacturing cost.

At least one embodiment of the present invention provides a display panel. The display panel includes a first substrate, a second substrate, a liquid crystal layer, a pixel electrode, a common electrode, a first polarizer and a second polarizer. The second substrate is overlapping with the first substrate. The liquid crystal layer, the pixel electrode and the common electrode are located between the first substrate and the second substrate. The pixel electrode includes a trunk portion, first to fourth branch portions, and first to fourth strip portions. The trunk portion is extending along a first direction. The first branch portion and the second branch portion are connected to a first end of the trunk portion, and are extending toward a first tilt direction and a second tilt direction, respectively. The third branch portion and the fourth branch portion are connected to a second end of the trunk portion, and are extending toward a third tilt direction and fourth tilt direction, respectively. The first strip portions are connected to the first branch portion and the second branch portion, and are extending along the first direction. The second strip portions are connected to the third branch portion and the fourth branch portion, and are extending along the first direction. The third strip portions are connected to the first branch portion, the trunk portion and the third branch portion, and extend along a second direction. The second direction is perpendicular to the first direction. The fourth strip portions are connected to the second branch portion, the trunk portion, and the fourth branch portion, and extend along the second direction. The first polarizer is located on the first substrate. The second polarizer is located on the second substrate.

At least one embodiment of the present invention provides a display panel. The display panel includes a first substrate, a second substrate, a liquid crystal layer, a pixel electrode, a common electrode, a first polarizer and a second polarizer. The second substrate is overlapping with the first substrate. The liquid crystal layer, the pixel electrode and the common electrode are located between the first substrate and the second substrate. The pixel electrode includes a trunk portion, a branch portion, first strip portions and second strip portions. The trunk portion is extending along a first direction. The branch portion is connected to the trunk portion and is extending along a second direction, wherein the first direction is perpendicular to the second direction. The first strip portions are extending along the second direction, wherein the trunk portion are passing through the first strip portions. The second strip portions are extending along the first direction, wherein the branch portion are passing through the second strip portions. The first polarizer is located on the first substrate. The second polarizer is located on the second substrate.

Based on the above, by the design of the pixel electrode, the display panel has the advantage of high transmittance, and the first polarizer and the second polarizer have the advantage of low manufacturing cost.

DESCRIPTION OF THE EMBODIMENTS

Figure 1A:
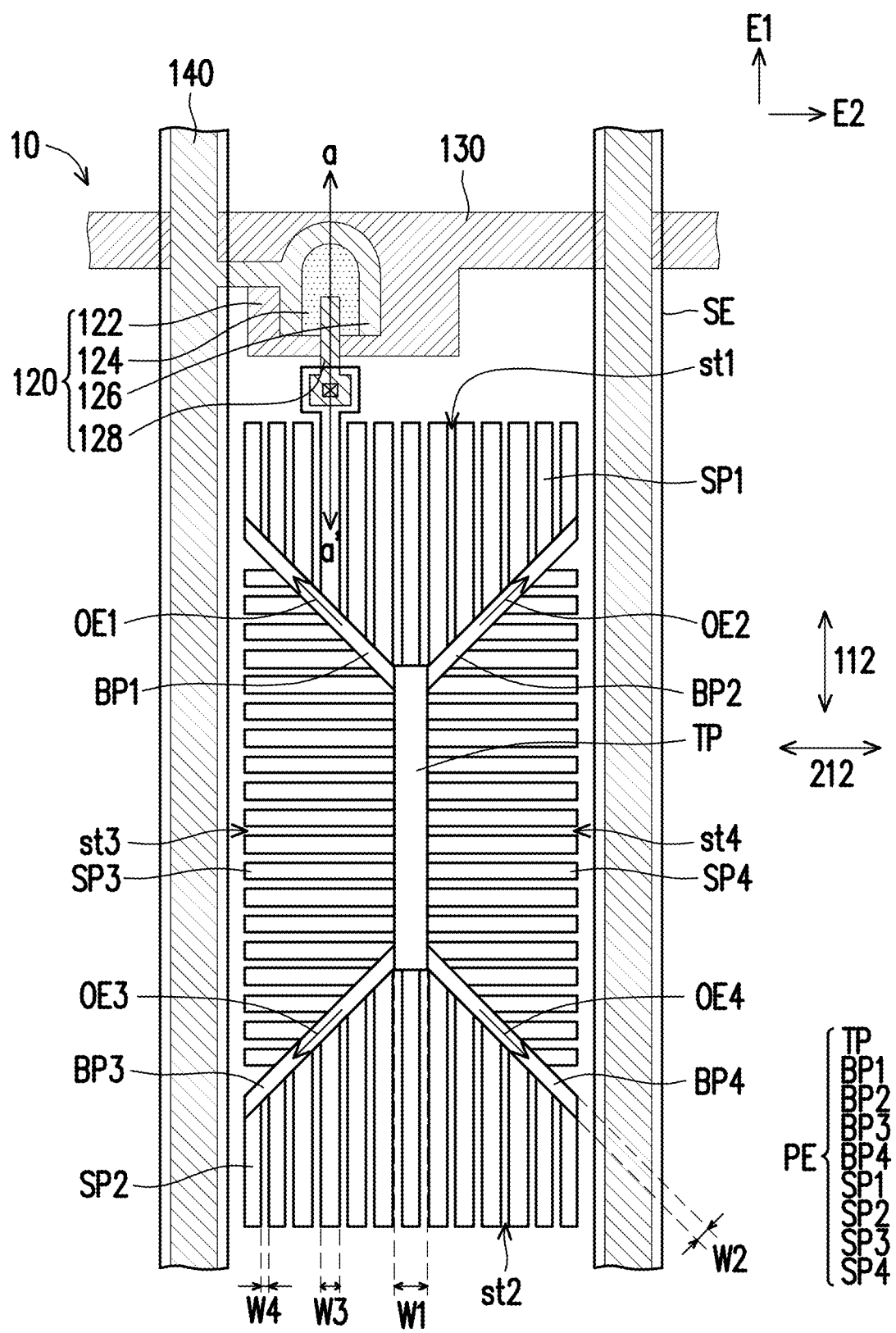
FIG. 1A is a schematic top view of a display panel according to an embodiment of the present invention.

Reference will now be made in detail to the present preferred embodiments of the disclosure, examples of which are illustrated in the accompanying drawings. Wherever possible, the same reference numbers are used in the drawings and the description to refer to the same or like parts.

Various embodiments of the disclosure are disclosed in the drawings, and for the sake of clarity, many of the practical details are set forth in the following description. As used herein, "connected" refers to two elements without one or more intervening elements, ie, "directly connected." "Electrically connected" means that the two elements may be "directly connected" or "indirectly connected", that is, there may be one or more intervening elements between the two elements.

It should be understood that, although the terms "first", "second", etc., may be used herein to describe various elements, components, regions, layers and/or sections, these elements, components, regions, layers, and/or sections should not be limited by these terms. These terms are used to distinguish one element, component, region, layer or section from another element, component, region, layer or section.

The terminology used herein is for the purpose of describing particular embodiments and is not intended to be limiting of the disclosure. As used herein, the singular forms "a", "an" and "the" are intended to include the plural forms as well, unless the context clearly indicates otherwise. Herein, "or" represents "and/or". The term "and/or" used herein includes any or a combination of one or more of the associated listed items. It will be further understood that the terms "comprises", "comprising", "includes" and/or "including", when used herein, specify the presence of stated features, regions, integers, steps, operations, elements, and/or components, but do not preclude the presence or addition of one or more other features, regions, integers, steps, operations, elements, components, and/or groups thereof.

Moreover, relative terms such as "below" or "bottom" and "above" or "top" may serve to describe the relation between one element and another element in the text according to the illustration of the drawings. It should also be understood that the relative terms are intended to include different orientations of a device in addition to the orientation shown in the drawings. For example, if a device in the drawings is flipped, an element described as being disposed "below" other elements shall be re-orientated to be "above" other elements. Thus, the exemplary term "below" may cover the orientations of "below" and "above", depending on a specific orientation of the drawings. Similarly, if a device in a figure is flipped over, the element originally described to be located "below" or "underneath" other element is oriented to be located "on" the other element. Therefore, the illustrative term "under" or "below" may include orientations of "above" and "under".

Figure 1B:
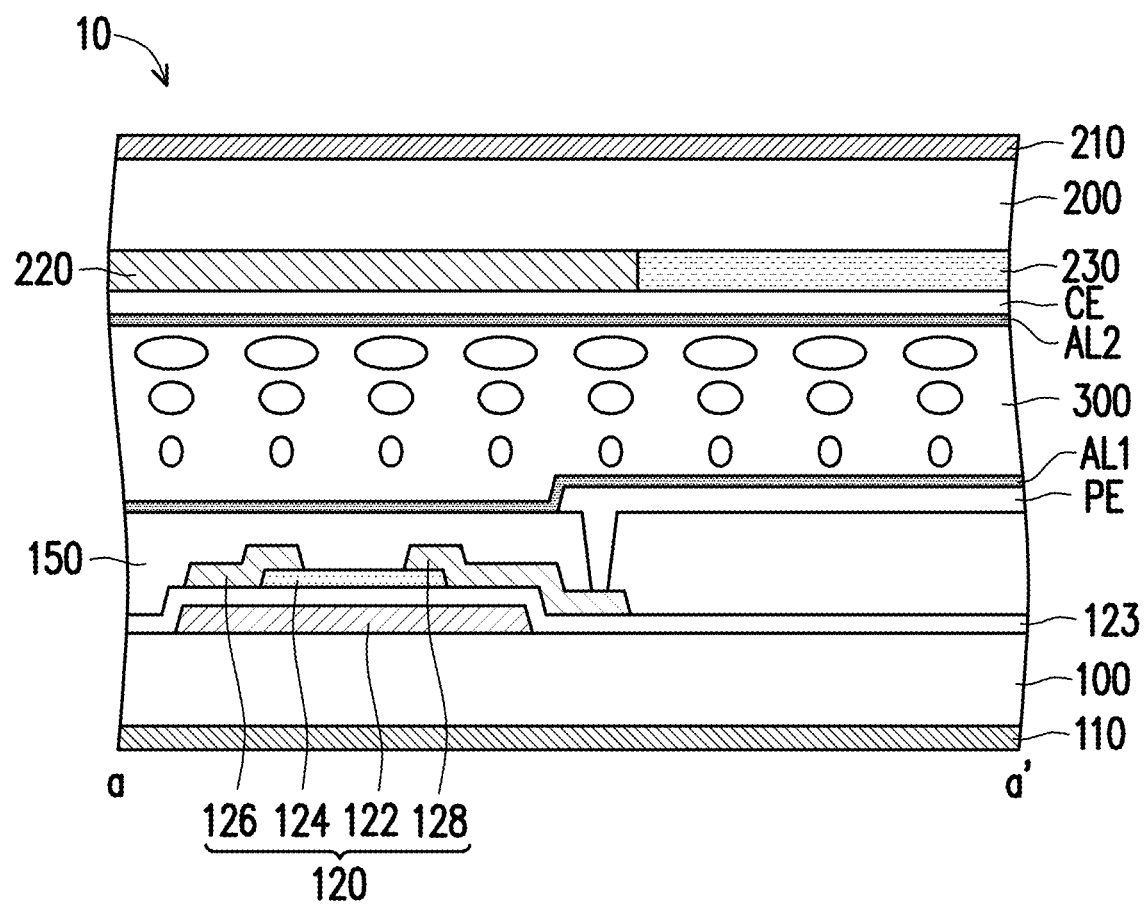
FIG. 1B is a schematic cross-sectional view along the line a-a' of FIG. 1A.

FIG. 1A is a schematic top view of a display panel according to an embodiment of the present invention. FIG. 1B is a schematic cross-sectional view along the line a-a' of FIG. 1A. It should be noted that FIG. 1A shows structure of one of sub-pixels of the display panel 10, and the number of the sub-pixels of the display panel 10 can be adjusted according to actual needs.

Referring to FIGS. 1A and 1B, the display panel 10 includes a first substrate 100 (not shown in FIG. 1A), a second substrate 200 (not shown in FIG. 1A), a liquid crystal layer 300 (not shown in FIG. 1A), a pixel electrode PE, a common electrode CE (not shown in FIG. 1A), a first polarizer 110 (not shown in FIG. 1A), and a second polarizer 210 (not shown in FIG. 1A). In this embodiment, the display panel 10 further includes an active element 120, a scan line 130, a data line 140, a shielding electrode SE, a black matrix 220 and a color conversion element 230. The active element 120, the scan line 130, the data line 140, the shielding electrode SE, the black matrix 220, the color conversion element 230, the liquid crystal layer 300, the pixel electrode PE and the common electrode CE are located between the first substrate 100 and the second substrate 200.

The second substrate 200 is overlapping with the first substrate 100. The material of the first substrate 100 and the second substrate 200 may include glass, quartz, organic polymer or other transparent materials.

The active elements 120, the scan line 130 and the data line 140 are located above the first substrate 100. In this embodiment, the active element 120, the scan line 130 and the data line 140 are located between the first substrate 100 and the second substrate 200. The active element 120 is electrically connected to the scan line 130 and the data line 140. In this embodiment, the data line 140 is extending along a first direction E1, and the scan line 130 is extending along a second direction E2. In this embodiment, the second direction E2 is perpendicular to the first direction E1.

The active element 120 may be any type of thin film transistor. For example, the active device 120 is a bottom gate type thin film transistor, a top gate type thin film transistor, a double gate type thin film transistor or other types of thin film transistors. In this embodiment, the active element 120 is a bottom gate type thin film transistor, but the present disclosure is not limited thereto.

The active device 120 includes a gate electrode 122, a channel layer 124, a source electrode 126 and a drain electrode 128. The gate electrode 122 is located above the first substrate 100 and is electrically connected to the scan line 130. The channel layer 124 is overlapping with the gate electrode 122, and a gate insulating layer 123 is sandwiched between the channel layer 124 and the gate electrode 122. The source electrode 126 and the drain electrode 128 are electrically connected to the channel layer 124. The source electrode 126 is electrically connected to the data line 140.

In some embodiments, based on the consideration of conductivity, the gate electrode 122, the scan line 130, the source electrode 126, the drain electrode 128 and the data line 140 are generally made of metal materials, but the invention is not limited thereto. In other embodiments, other conductive materials can also be used as the gate electrode 122, the scan line 130, the source electrode 126, the drain electrode 128 and the data line 140. For example: alloys, nitrides of metal materials, oxides of metal materials, oxynitrides of metal materials or other suitable materials or stacked layers of metal materials and other conductive materials.

In some embodiments, the channel layer 124 is a single-layer structure or multi-layer structure, which includes amorphous silicon, polysilicon, microcrystalline silicon, single crystal silicon, organic semiconductor materials, oxide semiconductor materials (eg, indium zinc oxide, indium gallium zinc oxide or other suitable material or combination of the above materials) or other suitable material or combination of the above materials.

The interlayer insulating layer 150 is located above the active element 120, the scan line 130 and the data line 140.

The shielding electrode SE is located above the interlayer insulating layer 150. In some embodiments, the shielding electrode SE is overlapping with the data line 140, and the shielding electrode SE is used to reduce the electric field generated between the data line 140 and the pixel electrode PE, thereby improving the light leakage problem of the display device. In other embodiments, the shielding electrode SE may have other shapes, and the shielding electrode SE is not limited to the shape shown in FIG. 1A.

The pixel electrode PE is electrically connected to the drain electrode 128 of the active element 120. In this embodiment, the pixel electrode PE is located above the interlayer insulating layer 150 and is electrically connected to the drain electrode 128 of the active device 120 through a conductive via passing through the interlayer insulating layer 150, but the invention is not limited thereto. In other embodiments, the pixel electrode PE is directly formed on the drain electrode 128 and the gate insulating layer 123, and is directly connected to the drain electrode 128 without any conductive vias.

In some embodiments, the pixel electrode PE includes a transparent conductive material, such as indium tin oxide, indium zinc oxide, aluminum tin oxide, aluminum zinc oxide, indium gallium zinc oxide, or stacked layers of at least two of the above. In this embodiment, the shielding electrode SE and the pixel electrode PE include the same material, and the shielding electrode SE and the pixel electrode PE belong to the same conductive pattern layer, but the invention is not limited thereto. In other embodiments, the shielding electrode SE and the pixel electrode PE include different materials, and the shielding electrode SE and the pixel electrode PE belong to different conductive pattern layers.

In this embodiment, the pixel electrode PE includes a trunk portion TP, a first branch portion BP1, a second branch portion BP2, a third branch portion BP3, a fourth branch portion BP4, first strip portions SP1, second strip portions SP2, third strip portions SP3, and fourth strip portions SP4. For the convenience of description, FIG. 1A shows the boundaries between the trunk portion TP, the first branch portion BP1, the second branch portion BP2, the third branch portion BP3, the fourth branch portion BP4, the first strip portions SP1, the second strip portions SP2, the third strip portions SP3, and the fourth strip portions SP4. However, in reality, the trunk portion TP, the first branch portion BP1, the second branch portion BP2, the third branch portion BP3, the fourth branch portion BP4, the first strip portions SP1, the second strip portions SP2, the third strip portions SP3, and the fourth strip portions SP4. are integrally connected.

The trunk portion TP is extending along the first direction E1. In some embodiments, the width W1 of the trunk portion TP is 4 micrometers to 8 micrometers.

The first branch portion BP1 and the second branch BP2 are connected to the first end of the trunk portion TP. The first branch portion BP1 and the second branch portion BP2 respectively extend toward the first tilt direction OE1 and the second tilt direction OE2 from the first end of the trunk portion TP.

The third branch portion BP3 and the fourth branch portion BP4 are connected to the second end of the trunk portion TP. The third branch portion BP3 and the fourth branch portion BP4 extend toward the third tilt direction OE3 and the fourth tilt direction OE4 from the second end of the trunk portion TP, respectively.

In some embodiments, the width W2 of each of the first branch portion BP1, the second branch portion BP2, the third branch portion BP3, and the fourth branch portion BP4 is less than or equal to the width W1 of the trunk portion TP. In some embodiments, the width W2 of each of the first branch portion BP1, the second branch portion BP2, the third branch portion BP3 and the fourth branch portion BP4 is 2 micrometers to 8 micrometers.

In some embodiments, the angle between the first direction E1 and the first tilt direction OE1 and the angle between the first direction E1 and the second tilt direction OE2 are 35 degrees to 55 degrees. In some embodiments, the angle between the first direction E1 and the third tilt direction OE3 and the angle between the first direction E1 and the fourth tilt direction OE4 are 125 degrees to 145 degrees.

The plurality of first strip portions SP1 are connected to the first branch portion BP1 and the second branch portion BP2, and are extending along the first direction E1. The plurality of second strip portions SP2 are connected to the third branch portion BP3 and the fourth branch portion BP4, and are extending along the first direction E1. In this embodiment, one of the first strip portions SP1 and one of the second strip portions SP2 are connected to and aligned with the trunk portion TP, but the invention is not limited thereto.

The plurality of third strip portions SP3 are connected to the first branch portion BP1, the trunk portion TP, and the third branch portion BP3, and are extending along the second direction E2. The plurality of fourth strip portions SP4 are connected to the second branch portion BP2, the trunk portion TP, and the fourth branch portion BP4, and are extending along the second direction E2.

In some embodiments, the width W3 of each of the first strip portions SP1, the second strip portions SP2, the third strip portions SP3 and the fourth strip portions SP4 is smaller than the width W1 of the trunk portion TP. In some embodiments, the width W3 of each of the first strip portions SP1, the second strip portions SP2, the third strip portions SP3 and the fourth strip portions SP4 is 1 micrometer to 4 micrometers.

In some embodiments, there are a plurality of first slits st1 between the first strip portions SP1, a plurality of second slits st2 between the second strip portions SP2, a plurality of third slits st3 between the third strip portions SP3, and a plurality of fourth slits st4 between the fourth strip portions SP4. The first slits st1 and the second slits st2 are extending along the first direction E1, and the third slits st3 and the fourth slits st4 are extending along the second direction E2.

In some embodiments, the width W4 of each of the first slits st1, the second slits st2, the third slits st3 and the fourth slits st4 are 1 micrometer to 4 micrometers. In some embodiments, the first slits st1, the second slits st2, the third slits st3, and the fourth slits st4 have the same or different width(s).

In this embodiment, the first strip portions SP1 and the second strip portions SP2 are symmetrically arranged on two sides of the trunk portion TP (for example, top side and bottom side in FIG. 1A), and the first slits st1 and the second slits st2 are symmetrically arranged on the two sides of the trunk portion TP (for example, top side and bottom side in FIG. 1A). In this embodiment, the third strip portions SP3 and the fourth strip portions SP4 are symmetrically arranged on two sides of the trunk portion TP (for example, the left side and right side in FIG. 1A), and the third slits st3 and the fourth slits st4 are symmetrically arranged on the two sides of the trunk portion TP (for example, the left and right sides in FIG. 1A).

In this embodiment, the first strip portion(s) SP1 of the pixel electrode PE is(are) connected to the drain electrode 128 of the active element 120, but the invention is not limited thereto. In other embodiments, other portion(s) of the pixel electrode PE is(are) connected to the drain electrode 128 of the active element 120. For example, the second strip portions SP2, the third strip portions SP3 or the fourth strip portions SP4 of the pixel electrode PE are connected to the drain electrode 128 of the active element 120.

The liquid crystal layer 300 is located above the pixel electrode PE. The liquid crystal layer 300 is located between the first alignment film AL1 and the second alignment film AL2. In this embodiment, the display panel 10 is a vertical alignment (VA) type liquid crystal display panel. The liquid crystal molecules in the liquid crystal layer 300 are vertically aligned when no voltage is applied, while the display panel 10 is in a dark state. After a voltage is applied to the liquid crystal molecules in the liquid crystal layer 300, the liquid crystal molecules in the liquid crystal layer 300 are overturned, while the display panel 10 is in a bright state. In this embodiment, the liquid crystal layer 300 includes a chiral dopant. The chiral dopant enables the liquid crystal molecules in the liquid crystal layer 300 to be arranged in a helical shape along a clockwise direction or counterclockwise direction in the bright state, and stacked between the first alignment film AL1 and the second alignment film AL2. Therefore, the chiral dopant can reduce the opaque dark area in the pixels, thereby increasing the transmittance of the pixels.

The black matrix 220 is overlapping with the active element 120, the scan line 130 and the data line 140. The color conversion element 230 is overlapping to the pixel electrode PE. In some embodiments, the color conversion element 230 includes a color filter element, but the invention is not limited thereto.

In this embodiment, the black matrix 220 and the color conversion element 230 are located on the second substrate 200, but the invention is not limited thereto. In other embodiments, the black matrix 220 is located on the first substrate 100 to form a black matrix on array (BOA) structure. In other embodiments, the color conversion element 230 is located on the first substrate 100 to form a color filter on array (COA) structure.

The common electrode CE is located on the second substrate 200. In this embodiment, the common electrode CE is located on the black matrix 220 and the color conversion element 230. The common electrode CE includes a transparent conductive material, such as indium tin oxide, indium zinc oxide, aluminum tin oxide, aluminum zinc oxide, indium gallium zinc oxide, or stacked layers of at least two of the above.

The first polarizer 110 is located on the first substrate 100. The second polarizer 210 is located on the second substrate 200. In this embodiment, the polarizing direction 112 of the first polarizer 110 is parallel to the first direction E1 or the second direction E2, and the polarizing direction 212 of the second polarizer 210 is perpendicular to the polarizing direction 112 of the first polarizer 110. In this embodiment, the polarizing direction 112 of the first polarizer 110 is parallel to the first direction E1, and the polarizing direction 212 of the second polarizer 210 is parallel to the second direction E2. In other embodiments, the polarizing direction 112 of the first polarizer 110 is parallel to the second direction E2, and the polarizing direction 212 of the second polarizer 210 is parallel to the first direction E1.

Generally, the polarizing direction of a polarizer will affect the transmittance of the display panel. Therefore, the polarizer has the polarizing direction that can make the display panel have better transmittance. The polarizing direction of the polarizer is generally parallel to the extension direction (e.g., the first direction E1) of the data lines or the extension direction (e.g., the second direction E2) of the scan lines of the display panel. If a polarizer with a polarizing direction that is not parallel to the extending direction of the data lines or the extending direction of the scan lines is used to be disposed in the display panel, the manufacturing cost of the display panel will be greatly increased.

In some embodiments, the liquid crystal layer 300 may be doped with chiral dopants to change the preferred polarizing direction (the polarizing direction that can make the display panel have better transmittance), resulting in the need to replace the polarizer(s) in the display panel with other polarizer(s) having different polarizing direction(s). In the present embodiment, through the design of the pixel electrode PE, a common polarizer (that is, a polarizer whose polarizing direction is parallel to the extension direction of the data lines or the extension direction of the scan lines) can be used to make the display panel 10 have the advantage of high transmittance. As such, the manufacturing cost of the display panel 10 can be reduced.

Figure 2:
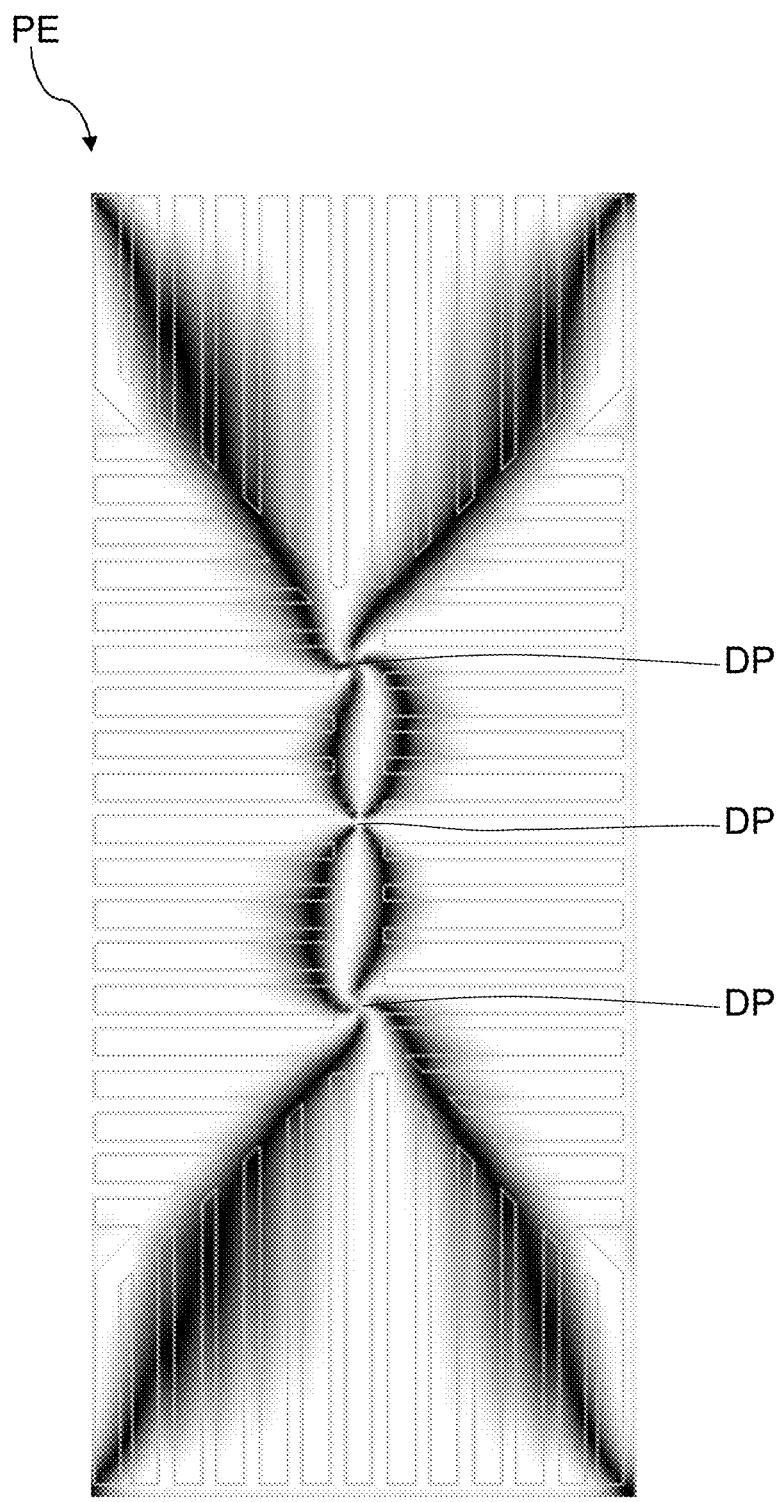
FIG. 2 is a simulation diagram of a liquid crystal effect of the display panel of FIG. 1A when performing an alignment procedure on a liquid crystal layer.

FIG. 2 is a simulation diagram of a liquid crystal effect of the display panel of FIG. 1A when performing an alignment procedure on a liquid crystal layer.

Referring to FIG. 2, a position corresponding to the trunk portion TP of the pixel electrode PE has defect points DP. For example, the defect points DP appear at the positions where the dark lines intersect. In this embodiment, three defect points DP appear at the position of the trunk portion TP.

Figure 3:
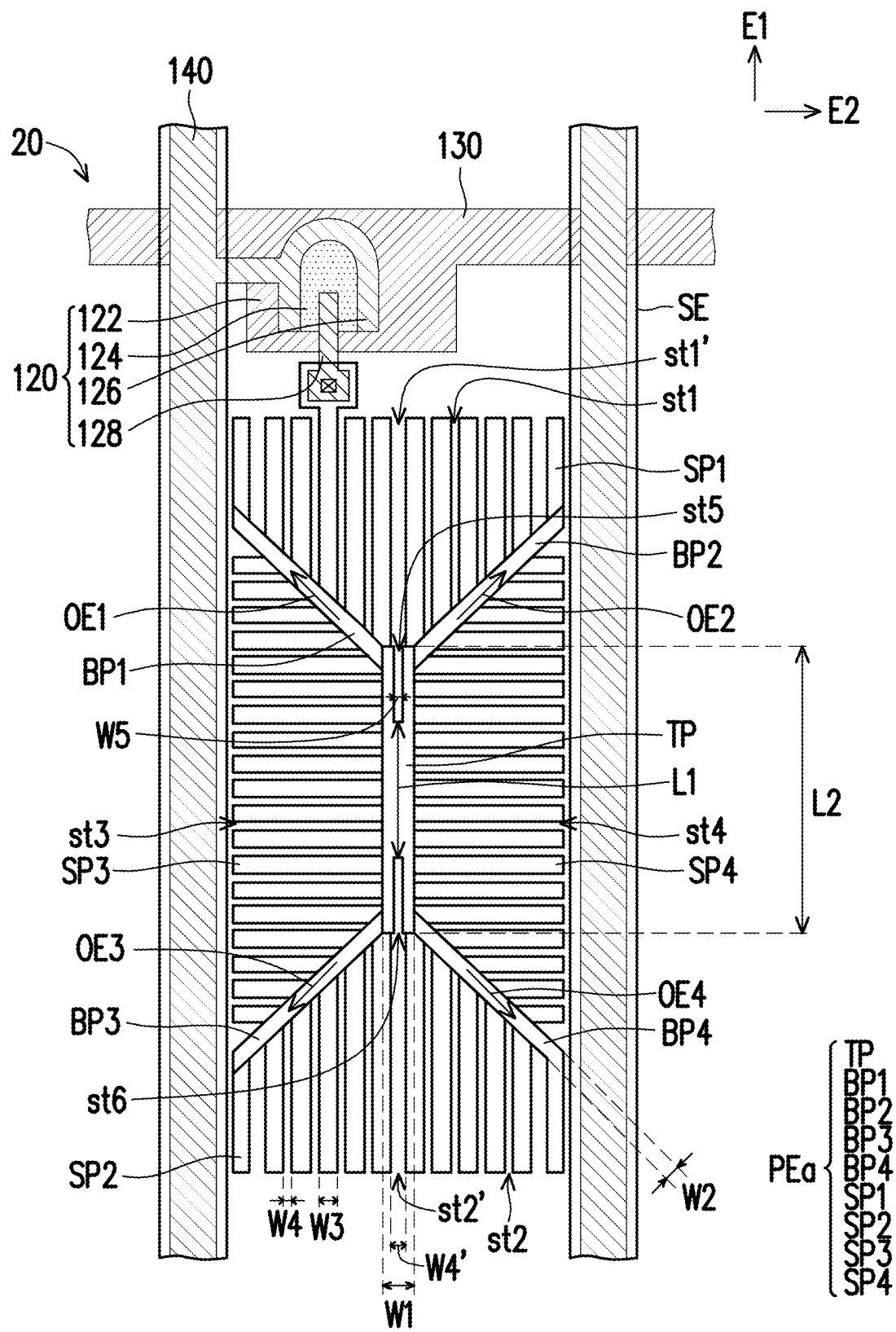
FIG. 3 is a schematic top view of a display panel according to an embodiment of the present invention.

FIG. 3 is a schematic top view of a display panel according to an embodiment of the present invention. It should be noted herein that, in embodiments provided in FIG. 3, element numerals and partial content of the embodiments provided in FIG. 1A and FIG. 1B are followed, the same or similar reference numerals being used to represent the same or similar elements, and description of the same technical content being omitted. For a description of an omitted part, reference may be made to the foregoing embodiment, and the descriptions thereof are omitted herein.

The difference between the display panel 20 of FIG. 3 and the display panel 10 of FIG. 1 is that the trunk portion TP of the pixel electrode PEa of the display panel 20 has a fifth slit st5 and a sixth slit st6 extending along the first direction E1. The fifth slit st5 extends inward from the first end of the trunk portion TP, and the sixth slit st5 extends inward from the second end of the trunk portion TP. The fifth slit st5 and the sixth slit st6 are aligned with the center of the trunk portion TP in the first direction E1.

Referring to FIG. 3, the distance L1 between the fifth slit st5 and the sixth slit st6 is 5% to 20% of the length L2 of the trunk portion TP. In some embodiments, the distance L1 between the fifth slit st5 and the sixth slit st6 is 27 micrometers, and the length L2 of the trunk portion TP is 62 micrometers.

In this embodiment, the width W5 of the fifth slit st5 is smaller than the width W4' of the first slit st1' between the two first strip portions SP1 adjacent to the fifth slit st5 (i.e., the first slit st1' aligned with the trunk portion TP). In this embodiment, the width W5 of the sixth slit st6 is smaller than the width W4' of the second slit st2' between the two second strip portions SP2 adjacent to the sixth slit st6 (i.e., the second slit st2' aligned with the trunk portion TP). In some embodiments, the width W5 of each of the fifth slit st5 and the sixth slit st6 are between 2 micrometers and 5 micrometers.

In some embodiments, the first slits, the second slits, the third slits, and the fourth slits have different widths. For example, in this embodiment, the width W4' of the first slit st1' located on the outermost side (the left and right sides in FIG. 3) and the first slit st1' aligned with the trunk portion TP is greater than or equal to the width W4 of the other first slits st1. Similarly, in this embodiment, the width W4' of the second slit st2' located at the outermost side (the left and right sides in FIG. 3) and the second slit st2' aligned with the trunk portion TP is greater than or equal to the width W4 of the other second slit st2.

In this embodiment, through the design of the pixel electrode PEa, a common polarizer (that is, a polarizer whose polarizing direction is parallel to the extending direction of the data line or the extending direction of the scanning line) can be used to make the display panel 20 have the advantage of high transmittance. As such, the manufacturing cost of the display panel 20 can be reduced.

Figure 4:
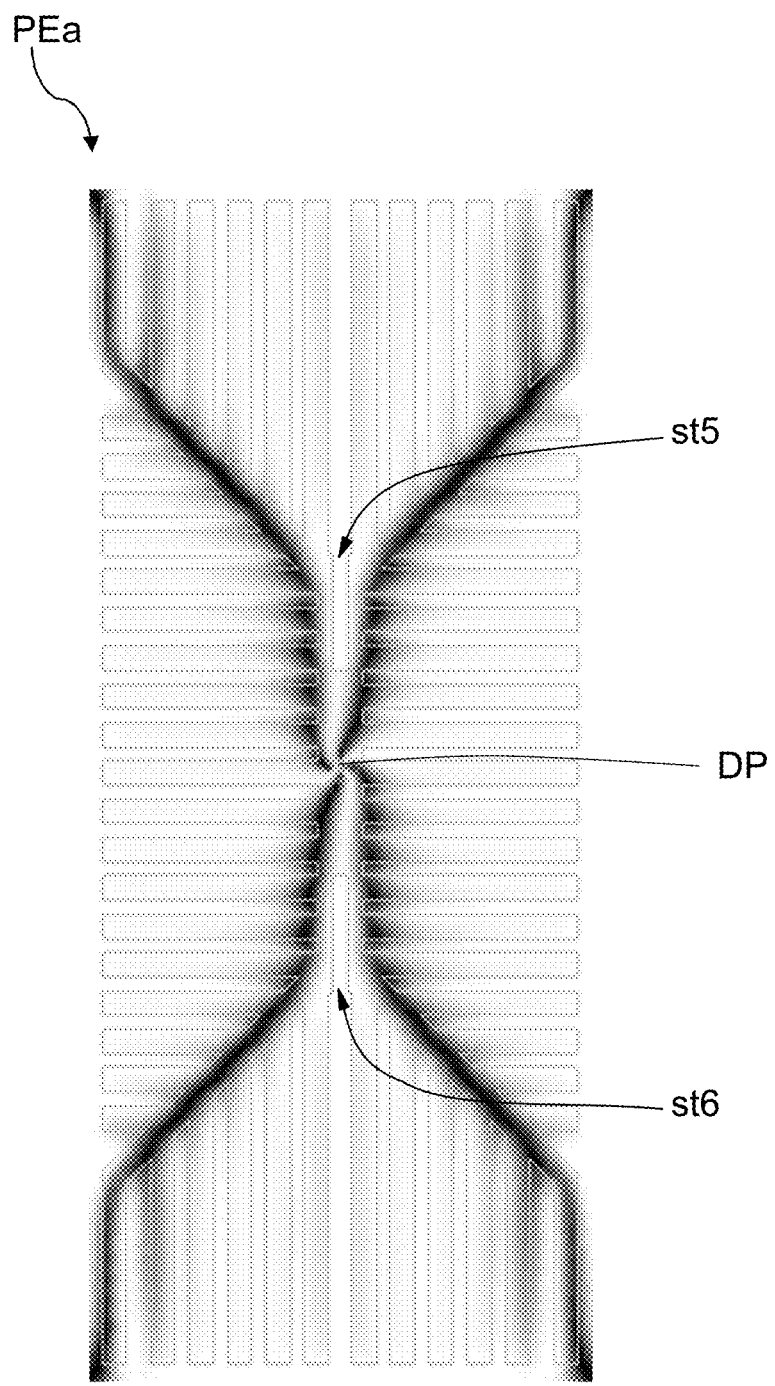
FIG. 4 is a simulation diagram of a liquid crystal effect of the display panel of FIG. 3 when performing an alignment procedure on a liquid crystal layer.

FIG. 4 is a simulation diagram of a liquid crystal effect of the display panel of FIG. 3 when performing an alignment procedure on a liquid crystal layer.

Referring to FIG. 3 and FIG. 4, a position corresponding to the trunk portion TP of the pixel electrode PEa has a defect point DP. In this embodiment, only one defect point DP appears at the position of the trunk portion TP.

Based on the above, the fifth slit st5 and the sixth slit st6 can reduce the number of defect point DP, thereby improving the influence of the defect point DP on the displayed screen.

Figure 5:
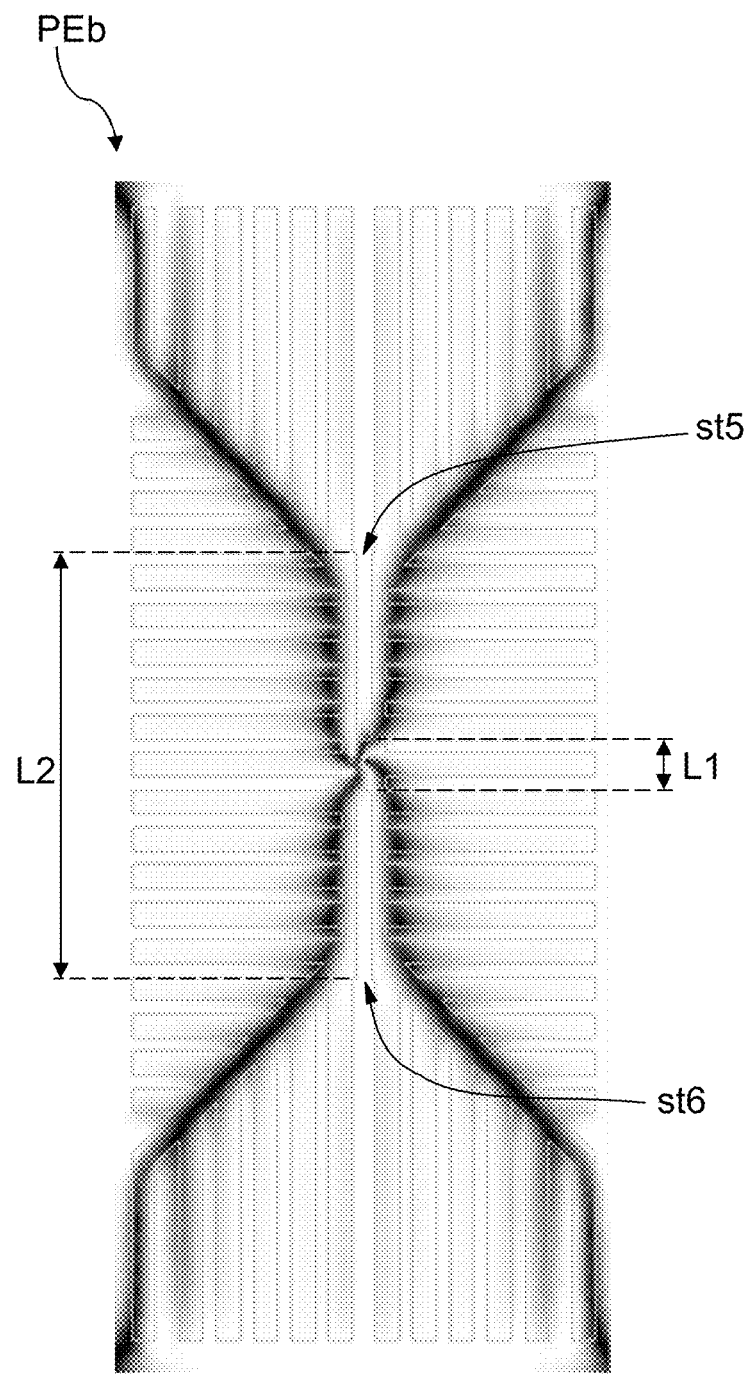
FIG. 5 is a simulation diagram of a liquid crystal effect of the display panel according to an embodiment of the present invention when performing an alignment procedure on the liquid crystal layer.

FIG. 5 is a simulation diagram of a liquid crystal effect of the display panel according to an embodiment of the present invention when performing an alignment procedure on the liquid crystal layer.

The difference between the display panel of FIG. 5 and the display panel 20 of FIG. 4 is that the distance L1 between the fifth slit st5 and the sixth slit st6 is further reduced in the embodiment of FIG. 5.

Referring to FIG. 5, the distance L1 between the fifth slit st5 and the sixth slit st6 is 7 micrometers, and the length L2 of the trunk portion TP is 62 micrometers.

Referring to FIG. 5, a position corresponding to the trunk portion TP of the pixel electrode PEb has a defect point DP. In this embodiment, only one defect point DP appears at the position of the trunk portion.

Based on the above, the fifth slit st5 and the sixth slit st6 can reduce the number of defect point DP, thereby improving the influence of the defective point DP on the displayed screen.

Figure 6A:
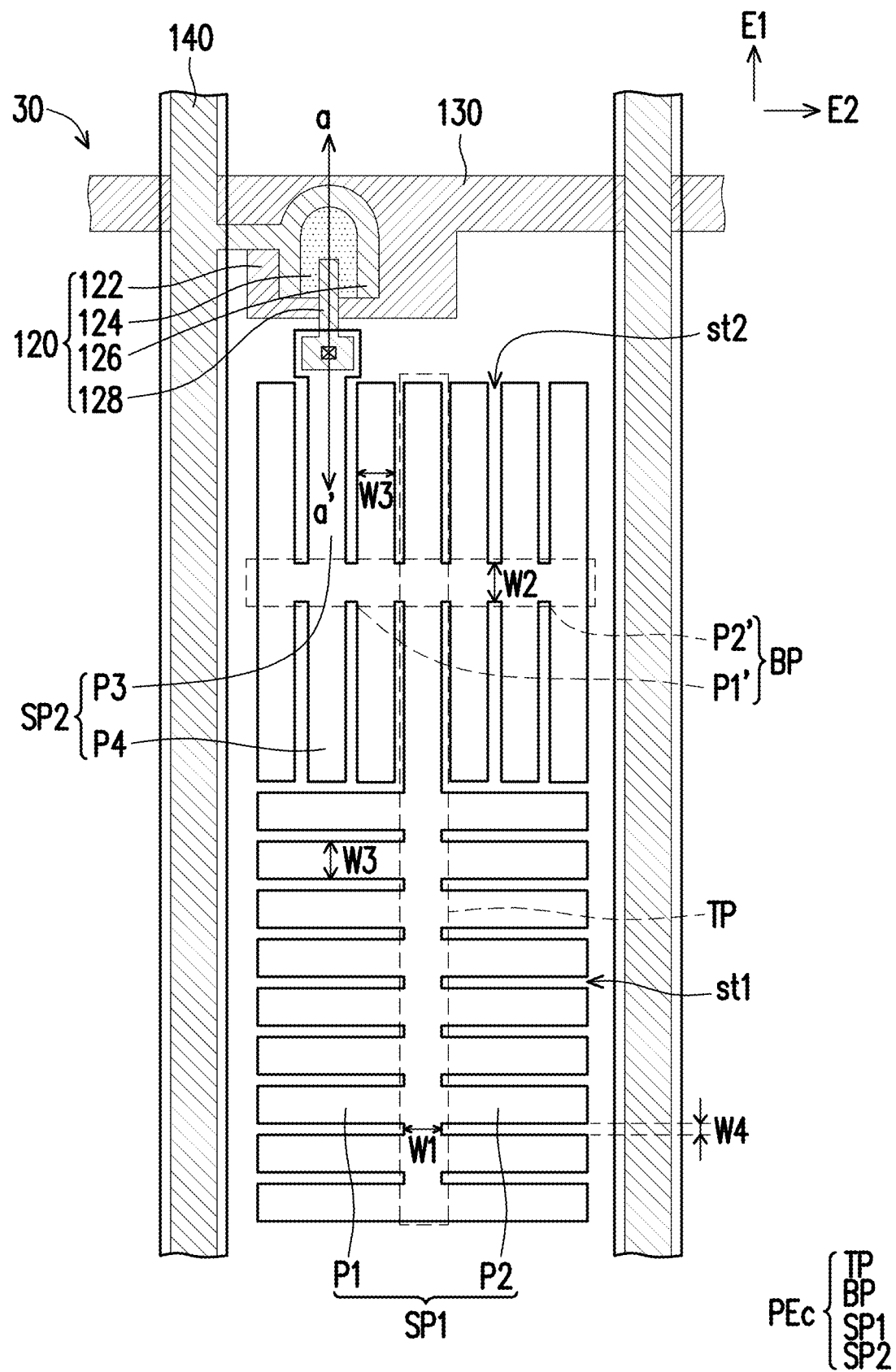
FIG. 6A is a schematic top view of the display panel according to an embodiment of the present invention.
Figure 6B:
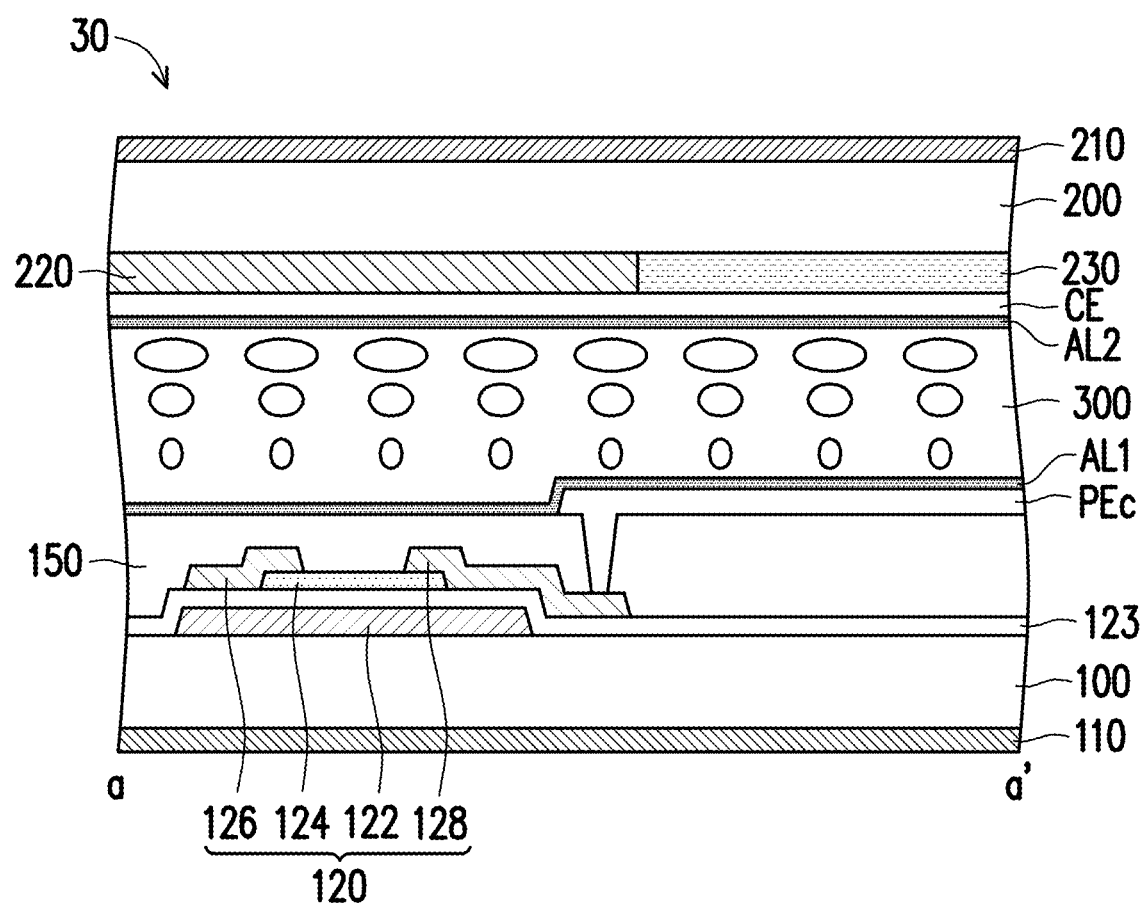
FIG. 6B is a schematic cross-sectional view along the line a-a' of FIG. 6A.

FIG. 6A is a schematic top view of a display panel according to an embodiment of the present invention. FIG. 6B is a schematic cross-sectional view along line a-a' of FIG. 6A. It should be noted herein that, in embodiments provided in FIG. 6A and FIG. 6B, element numerals and partial content of the embodiments provided in FIG. 1A and FIG. 1B are followed, the same or similar reference numerals being used to represent the same or similar elements, and description of the same technical content being omitted. For a description of an omitted part, reference may be made to the foregoing embodiment, and the descriptions thereof are omitted herein.

The difference between the display panel 30 of FIGS. 6A and 6B and the display panel 10 of FIGS. 1A and 1B is that the pixel electrodes PEc of the display panel 30 and the pixel electrodes PE of the display panel 10 have different shapes.

Referring to FIGS. 6A and 6B, the display panel 30 includes a first substrate 100, a second substrate 200, a liquid crystal layer 300, a pixel electrode PEc, a common electrode CE, a first polarizer 110 and a second polarizer 210. In this embodiment, the display panel 30 further includes an active element 120, a scan line 130, a data line 140, a shielding electrode SE, a black matrix 220 and a color conversion element 230. The active element 120, the scan line 130, the data line 140, the shielding electrode SE, the black matrix 220, the color conversion element 230, the liquid crystal layer 300, the pixel electrode PEc and the common electrode CE are located between the first substrate 100 and the second substrate 200.

In this embodiment, the display panel 30 is a vertical alignment (VA) type liquid crystal display panel. In this embodiment, the liquid crystal layer 300 includes a chiral dopant.

In this embodiment, the pixel electrode PEc includes a trunk portion TP, a branch portion BP, first strip portions SP1 and second strip portions SP2. The trunk portion TP, the branch portion BP, the first strip portions SP1, and the second strip portions SP2 are integrally connected.

The trunk portion TP is extending along the first direction E1. In some embodiments, the width W1 of the trunk portion TP is 2 micrometers to 8 micrometers.

The branch portion BP is connected to the trunk portion TP and is extending along the second direction E2, wherein the first direction E1 is perpendicular to the second direction E2. In some embodiments, the width W2 of the branch portion BP is 2 micrometers to 8 micrometers.

The first strip portions SP1 are extending along the second direction E2, wherein the trunk portion TP penetrates through the first strip portions SP1. In this embodiment, the trunk portion TP penetrates through the centers of the first strip portions SP1, so that each of the first strip portions SP1 includes a first portion P1 and a second portion P2 symmetrically disposed on two sides of the trunk portion TP. In this embodiment, the trunk portion TP penetrates through the center of the branch portion BP, so that the branch portion BP includes a first portion P1' and a second portion P2' symmetrically disposed on the two sides of the trunk portion TP.

The second strip portions SP2 are extending along the first direction E1, wherein the branch portion BP penetrates through the second strip portions SP2. In this embodiment, the branch portion BP penetrates through the centers of the second strip portions SP2, so that each of the second strip portions SP2 includes a first portion P3 and a second portion P4 symmetrically disposed on two sides of the branch portion BP.

In some embodiments, the width W3 of each of the first strip portions SP1 and the second strip portions SP2 is 1 micrometer to 4 micrometers.

In some embodiments, there are a plurality of first slits st1 between the first strip portions SP1, and a plurality of second slits st2 between the second strip portions SP2. The first slits st1 are disposed on the two sides of the trunk portion TP, and the second slits st2 are disposed on the two sides of the branch portion BP. In this embodiment, the first slits st1 are symmetrically disposed on the two sides of the trunk portion TP, and the second slits st2 are symmetrically disposed on the two sides of the branch portion BP.

In some embodiments, the width W4 of each of the first slits st1 and the second slits st2 is 1 micrometer to 4 micrometers.

In this embodiment, through the design of the pixel electrode PEc, a common polarizer (that is, a polarizer whose polarizing direction is parallel to the extension direction of the data line or the extension direction of the scan line) can be used to make the display panel 30 have the advantage of high transmittance. As such, the manufacturing cost of the display panel 30 can be reduced.

Figure 7:
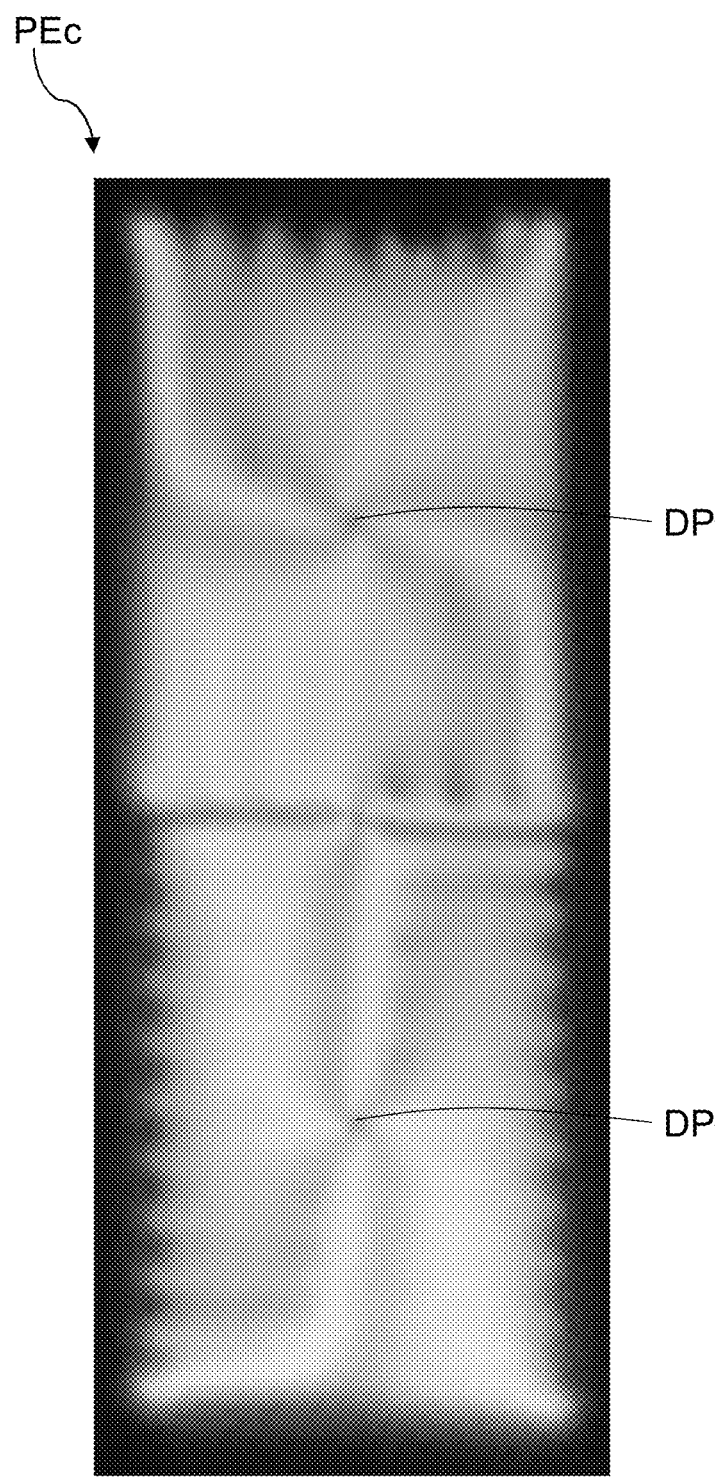
FIG. 7 is a simulation diagram of a liquid crystal effect of the display panel of FIG. 6A when performing an alignment procedure on a liquid crystal layer.

FIG. 7 is a simulation diagram of a liquid crystal effect of the display panel of FIG. 6A when performing an alignment procedure on a liquid crystal layer.

Referring to FIG. 7, a position corresponding to the trunk portion of the pixel electrode PEc has defect points DP, for example, the defect points DP appear at positions where dark lines intersect. In this embodiment, two defect points DP appear at the position of the trunk portion.

What is claimed is:

1. A display panel, comprising:
a first substrate and a second substrate overlapping with the first substrate;
a liquid crystal layer, a pixel electrode and a common electrode located between the first substrate and the second substrate, and the pixel electrode comprising:
  a trunk portion extending along a first direction;
  a first branch portion and a second branch portion, connected to a first end of the trunk portion, and extending toward a first tilt direction and a second tilt direction respectively;
  a third branch portion and a fourth branch portion, connected to a second end of the trunk portion, and extending toward a third tilt direction and a fourth tilt direction respectively, wherein the trunk portion has a first slit and a second slit extending along the first direction, wherein the first slit is extending inward from the first end, and the second slit is extending inward from the second end, wherein the first slit and the second slit are aligned with a center of the trunk portion in the first direction;
  first strip portions, connected to the first branch portion and the second branch portion, and extending along the first direction;
  second strip portions, connected to the third branch portion and the fourth branch portion, and extending along the first direction;
  third strip portions, connected to the first branch portion, the trunk portion and the third branch portion, and extending along a second direction, wherein the second direction is perpendicular to the first direction; and
  fourth strip portions, connected to the second branch portion, the trunk portion and the fourth branch portion, and extending along the second direction;
a first polarizer located on the first substrate; and
a second polarizer located on the second substrate.

2. The display panel according to claim 1, wherein a width of the trunk portion is 4 micrometers to 8 micrometers, a width of each of the first branch portion, the second branch portion, the third branch portion and the fourth branch portion is 2 micrometers to 8 micrometers, and a width of each of the first strip portions, the second strip portions, the third strip portions and the fourth strip portions is 1 micrometer to 4 micrometers, wherein a width of each of third slits between the first strip portions, fourth slits between the second strip portions, fifth slits between the third strip portions and sixth slits between the fourth strip portions are 1 micrometer to 4 micrometers.

3. The display panel according to claim 1, wherein an angle between the first direction and the first tilt direction and an angle between the first direction and the second tilt direction are 35 degrees to 55 degrees, and an angle between the first direction and the third tilt direction and an angle between the first direction and the fourth tilt direction are 125 degrees to 145 degrees.

4. The display panel according to claim 1, wherein a width of the first slit is smaller than a width of a third slit between two first strip portions adjacent to the first slit.

5. The display panel according to claim 1, wherein a width of each of the first slit and the second slit is between 2 micrometers and 5 micrometers.

6. The display panel according to claim 1, wherein the third strip portions and the fourth strip portions are symmetrically disposed on two sides of the trunk portion.

7. The display panel according to claim 1, wherein the first strip portions and the second strip portions are symmetrically disposed on two sides of the trunk portion.

8. The display panel according to claim 1, wherein a polarizing direction of the first polarizer is parallel to the first direction or the second direction, and a polarizing direction of the second polarizer is perpendicular to the polarizing direction of the first polarizer.

9. The display panel according to claim 1, wherein the liquid crystal layer comprises a chiral dopant.

10. A display panel, comprising:
a first substrate and a second substrate overlapping with the first substrate;
a liquid crystal layer, a pixel electrode and a common electrode located between the first substrate and the second substrate, and the pixel electrode comprising:
  a trunk portion extending along a first direction;
  a first branch portion and a second branch portion, connected to a first end of the trunk portion, and extending toward a first tilt direction and a second tilt direction respectively;
  a third branch portion and a fourth branch portion, connected to a second end of the trunk portion, and extending toward a third tilt direction and a fourth tilt direction respectively, wherein the trunk portion has a first slit and a second slit extending along the first direction, wherein the first slit is extending inward from the first end, and the second slit is extending inward from the second end, wherein a distance between the first slit and the second slit is 5% to 20% of a length of the trunk portion;
  first strip portions, connected to the first branch portion and the second branch portion, and extending along the first direction;
  second strip portions, connected to the third branch portion and the fourth branch portion, and extending along the first direction;
  third strip portions, connected to the first branch portion, the trunk portion and the third branch portion, and extending along a second direction, wherein the second direction is perpendicular to the first direction; and
  fourth strip portions, connected to the second branch portion, the trunk portion and the fourth branch portion, and extending along the second direction;
a first polarizer located on the first substrate; and
a second polarizer located on the second substrate.

11. The display panel according to claim 10, wherein a width of the trunk portion is 4 micrometers to 8 micrometers, a width of each of the first branch portion, the second branch portion, the third branch portion and the fourth branch portion is 2 micrometers to 8 micrometers, and a width of each of the first strip portions, the second strip portions, the third strip portions and the fourth strip portions is 1 micrometer to 4 micrometers, wherein a width of each of third slits between the first strip portions, fourth slits between the second strip portions, fifth slits between the third strip portions and sixth slits between the fourth strip portions are 1 micrometer to 4 micrometers.

12. The display panel according to claim 10, wherein an angle between the first direction and the first tilt direction and an angle between the first direction and the second tilt direction are 35 degrees to 55 degrees, and an angle between the first direction and the third tilt direction and an angle between the first direction and the fourth tilt direction are 125 degrees to 145 degrees.

13. The display panel according to claim 10, wherein a width of the first slit is smaller than a width of a third slit between two first strip portions adjacent to the first slit.

14. The display panel according to claim 10, wherein a width of each of the first slit and the second slit is between 2 micrometers and 5 micrometers.

15. The display panel according to claim 10, wherein the third strip portions and the fourth strip portions are symmetrically disposed on two sides of the trunk portion.

16. The display panel according to claim 10, wherein the first strip portions and the second strip portions are symmetrically disposed on two sides of the trunk portion.

17. The display panel according to claim 10, wherein a polarizing direction of the first polarizer is parallel to the first direction or the second direction, and a polarizing direction of the second polarizer is perpendicular to the polarizing direction of the first polarizer.

18. The display panel according to claim 10, wherein the liquid crystal layer comprises a chiral dopant.

\* \* \* \* \*